United States Patent
Kim

(10) Patent No.: US 9,529,600 B2
(45) Date of Patent: Dec. 27, 2016

(54) SYSTEM AND METHOD FOR BOOTING APPLICATION OF TERMINAL TO INCREASE BOOTING EFFICIENCY BASED ON AN EXECUTION TIME OF THE APPLICATION

(71) Applicant: HYUNDAI MOBIS Co., Ltd., Yongin-si (KR)

(72) Inventor: Hyun Tae Kim, Yongin-si (KR)

(73) Assignee: HYUNDAI MOBIS Co., Ltd., Yongin-si (KR)

( * ) Notice: Subject to any disclaimer, the term of this patent is extended or adjusted under 35 U.S.C. 154(b) by 197 days.

(21) Appl. No.: 14/292,955

(22) Filed: Jun. 2, 2014

(65) Prior Publication Data
US 2015/0212825 A1  Jul. 30, 2015

(30) Foreign Application Priority Data
Jan. 28, 2014 (KR) ........................ 10-2014-0010557

(51) Int. Cl.
  G06F 9/00   (2006.01)
  G06F 19/00  (2011.01)
  G06F 9/44   (2006.01)

(52) U.S. Cl.
  CPC .......... *G06F 9/4406* (2013.01); *G06F 9/4401* (2013.01)

(58) Field of Classification Search
  CPC .................................................. G06F 9/4401
  USPC .......................................................... 713/2
  See application file for complete search history.

(56) References Cited

U.S. PATENT DOCUMENTS

| | | | | |
|---|---|---|---|---|
| 7,664,931 B2* | 2/2010 | Erforth et al. | | 712/42 |
| 7,937,198 B2* | 5/2011 | Brozovich et al. | | 701/33.4 |
| 9,141,802 B2* | 9/2015 | Yao et al. | | |
| 9,223,601 B2* | 12/2015 | Akiyama et al. | | |
| 2014/0019873 A1* | 1/2014 | Gupta et al. | | 715/744 |
| 2014/0040298 A1* | 2/2014 | Iguchi et al. | | 707/758 |
| 2014/0278956 A1* | 9/2014 | Asoh et al. | | 705/14.49 |

FOREIGN PATENT DOCUMENTS

| | | |
|---|---|---|
| JP | 2006-150999 A | 6/2006 |
| JP | 2010-79566 A | 4/2010 |
| KR | 10-0640243 B1 | 11/2006 |
| KR | 10-2010-0058163 A | 6/2010 |

* cited by examiner

*Primary Examiner* — Suresh Suryawanshi

(57) ABSTRACT

Provided are an application booting system and method that control a booting time and booting order of each application installed in a terminal (for example, an AVN) according to an importance of each application. The application booting system and method generate or update priority information of each application on the basis of an execution time and the number of executions of each application installed in the terminal, and when power is supplied to the terminal, the application booting system and method control an application to be booted according to the priority information while a system of the terminal is being booted. Accordingly, the application booting system and method enhance a booting speed of a whole system, and provide an execution convenience of an application having a high importance after booting of the system is completed.

15 Claims, 5 Drawing Sheets

FIG. 2

| APPLICATION | NUMBER OF EXECUTIONS (WEIGHT X) AFTER BOOTING | NUMBER OF EXECUTIONS (WEIGHT Y) IN DRIVING | PRIORITY INFORAMTION |
|---|---|---|---|
| RADIO | A | B | AX + BY |
| DMB | C | D | CX + DY |
| USB | E | F | EX + FY |
| BT | G | H | GX + HY |
| MUSIC | I | J | IX + JY |
| NAVI | K | L | KX + LY |
| SETTING | M | N | MX + NY |

SYSTEM AND METHOD FOR BOOTING APPLICATION OF TERMINAL TO INCREASE BOOTING EFFICIENCY BASED ON AN EXECUTION TIME OF THE APPLICATION

CROSS-REFERENCE TO RELATED APPLICATIONS

This application claims priority under 35 U.S.C. §119 to Korean Patent Application No. 10-2014-0010557, filed on Jan. 28, 2014, the disclosure of which is incorporated herein by reference in its entirety.

TECHNICAL FIELD

The present invention relates to a system and method for booting an application of a terminal, and more particularly, to an application booting system and method which, when booting an audio video navigation (AVN) apparatus of a vehicle, controls a booted application to increase a booting efficiency of an AVN system.

BACKGROUND

At present, a vehicle is being recognized by a driver as a living space instead of a simple transportation means. In order for a vehicle to act as a living space, technologies for providing various services in a vehicle are being developed and commercialized.

In this context, an AVN apparatus is equipped in a vehicle, and provides a voice recognition function, a video providing function, and a Bluetooth function, in addition to a navigation function which is fundamentally necessary to drive a vehicle.

However, when a door of a vehicle is opened or the vehicle is in an ACC ON state, a related art AVN system is supplied with power to thereby be booted, and simultaneously with the booting of the system, applications that respectively perform services provided through the AVN system are booted.

As described above, the applications installed in the related art AVN system are booted simultaneously with the booting of the system, and for this reason, much time is expended in booting the AVN system. To solve such a problem, a method of booting an application is provided according to system setting or user setting, but since the method does not reflect an actual importance of each application applied to the AVN system, an efficiency of the method becomes lower.

SUMMARY

Accordingly, the present invention provides an application booting system and method that control a booted application in an AVN system booting process on the basis of an execution time and the number of executions of a booted and executed application, and thus change a booting order according to an importance of the application, thereby enhancing a booting speed of the AVN system.

In one general aspect, a system for booting an application of a terminal includes: a priority setting unit configured to generate or update priority information of an application installed in a terminal, based on an execution time and number of executions of the application; a storage unit configured to store the priority information; and an application booting unit configured to boot the application according to the priority information when power is supplied to the terminal.

The priority setting unit may generate the priority information, based on a summation of a value, which is obtained by multiplying number of executions of the application in a first section and a first weight, and a value which is obtained by multiplying number of executions of the application in a second section and a second weight. Here, the first weight may be a value for increasing the number of executions in the first section, and the second weight may be a value for decreasing the number of executions in the second section.

The priority setting unit may generate the priority information according to the number of executions of the application within a predetermined time after system booting of the terminal is completed. Alternatively, the priority setting unit may generate the priority information, based on a multiplication of the number of executions based on the execution time of the application and a weight based on the execution time of the application.

When the power is supplied to the terminal, while a system of the terminal is being booted, the application booting unit may boot an application having the priority information, or boot an application of which a value of the priority information is equal to or greater than a predetermined value. When system booting of the terminal is completed, the application booting unit may boot an application of which a value of the priority information is less than a predetermined value when system booting of the terminal is completed.

When there is no priority information, the application booting unit may boot all applications installed in the terminal while a system of the terminal is being booted.

In another general aspect, a method of booting an application of a terminal includes: when power is supplied to a terminal, checking priority information of an application installed in the terminal; and booting the application according to the priority information, wherein the priority information is generated or updated based on an execution time and number of executions of the application.

The method may further include receiving information about a preference application from a user, and reflecting the information to generate or update the priority information.

Other features and aspects will be apparent from the following detailed description, the drawings, and the claims.

BRIEF DESCRIPTION OF THE DRAWINGS

FIG. 2 is a diagram illustrating an example of setting priority information of applications in the application booting system according to an embodiment of the present invention.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

The present invention relates to an application booting system and method of a terminal that enhance a system booting speed, and provides a user with an execution convenience of an application having the high frequency number of use, and may be applied to all terminals with an operating system (OS) and an application installed therein. However, an AVN system equipped in a vehicle will be described below as an example.

Figure 1:
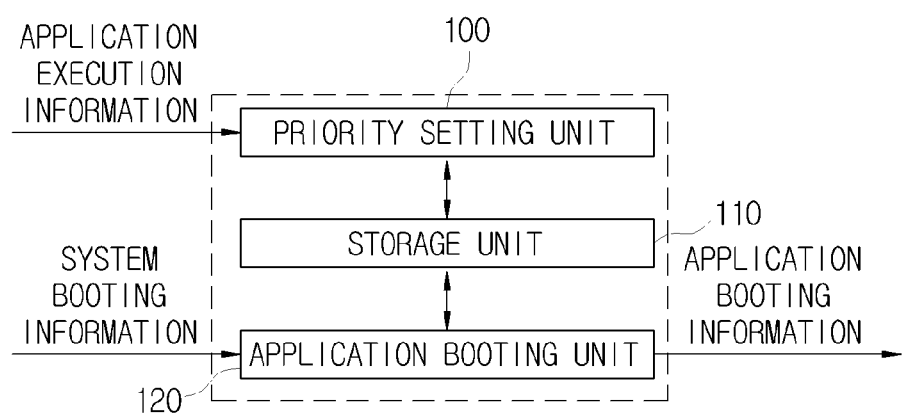
FIG. 1 is a block diagram illustrating a configuration of an application booting system according to an embodiment of the present invention.

FIG. 1 is a block diagram illustrating a configuration of an application booting system according to an embodiment of the present invention.

The application booting system according to an embodiment of the present invention includes a priority setting unit 100, a storage unit 110, and an application booting unit 120.

The priority setting unit 100 generates or updates priority information of applications which is based on to determine a booting time or booting order of each application installed in the AVN system, and stores the generated or updated priority information in the storage unit 110.

In generating or updating the priority information of each application installed in the AVN system, the priority setting unit 100 generates or updates the priority information on the basis of an execution time or the number of executions of each application.

According to an embodiment, the AVN system is supplied with power, and after booting of the AVN system is completed, when an application is executed by a user within a predetermined time, priority information of the executed application increases (for example, the priority information is changed from 0 to 1).

The priority-increased application may be an application having a high possibility, which will be used immediately after booting of the AVN system is completed, among the applications installs in the AVN system. Therefore, when the AVN system is booted after the priority information is generated or updated, a corresponding application is booted along with the AVN system, thereby providing a user with an execution convenience of the corresponding application.

According to another embodiment, the priority information of the applications installed in the AVN system may be generated or updated based on the number of executions of each of the applications. Therefore, an application having the high frequency number of use is booted simultaneously with booting of the AVN system, thereby enabling a user to easily execute a corresponding application.

However, although the number of executions of an application is large, it may not be considered there to be a high possibility that a user will execute the application as soon as booting of the AVN system is completed. Therefore, the present invention provides a method that generates priority information in consideration of all an execution time and the number of executions of an application.

FIG. 2 is a diagram illustrating an example in which the application booting system according to an embodiment of the present invention generates priority information on the basis of an execution time and the number of executions of each application installed in the AVN system.

As illustrated in FIG. 2, when applications such as Radio, DMB, USB, BT, MUSIC, NAVI, and Setting are installed in the AVN system, the AVN system records the number of executions (the number of executions in a first section) of each of the applications after booting of the AVN system and the number of executions (the number of executions in a second section) of each application in driving. This is an example of dividing execution-time sections, which may be divided into sections within and after a predetermined time after the AVN system is booted.

Priority information of each application is generated by using the number of times each application installed in the AVN system is executed in each of the sections and a weight of each section.

For example, when the number of executions of the application "Radio" in a first section is A, a weight of the first section is X, the number of executions in a second section is B, and a weight of the second section is Y, the application booting system generates or updates "AX+BY" as priority information of the application "Radio", and stores the priority information.

In this case, it may be considered that an importance of an application executed in the first section is higher, and thus, the weight "X" of the first section may be set to a value greater than one, and the weight "Y" of the second section may be set to a value less than one.

Whenever each application installed in the AVN system is executed, the priority setting unit 100 records the number of executions, and generates or updates priority information. Furthermore, when an application is executed after the AVN system is booted and then a certain time elapses, it may be considered that the influence of the execution is small on an importance of the application, and thus, the execution may not be reflected in the number of executions.

The storage unit 110 stores the number of executions and priority information based on an execution time of each application installed in the AVN system, and also stores priority information that is updated according to each application being executed.

When the AVN system is supplied with power to thereby be booted, the application booting unit 120 controls an application to be booted along with the booting of the AVN system, based on the priority information of the applications installed in the AVN system.

For example, when power is supplied to the AVN system, the application booting unit 120 may check the priority information of each application, and while the AVN system is being booted, the application booting unit 120 may boot an application having priority information. Alternatively, the application booting unit 120 may boot only an application of which a priority information value is equal to or greater than a predetermined value.

In this case, the number of applications which are booted while the AVN system is being booted is limited, and only an application included in a corresponding range may be booted. For example, when the number of applications which are booted while the AVN system is being booted is limited to five, only five applications may be booted in descending order of priority information, or among applications of which a priority information value is equal to or greater than the predetermined value, only five or less applications may be booted.

An application, which is not booted according to priority information while the AVN system is being booted, progresses to a background in a system stabilizing stage after the AVN system is booted, and is booted.

Therefore, only an application which preferentially requires booting is booted while the AVN system is being booted, and thus, a booting speed of the AVN system itself is enhanced, thereby providing convenience to a user that desires to execute an application after the AVN system is booted.

Figure 3A:
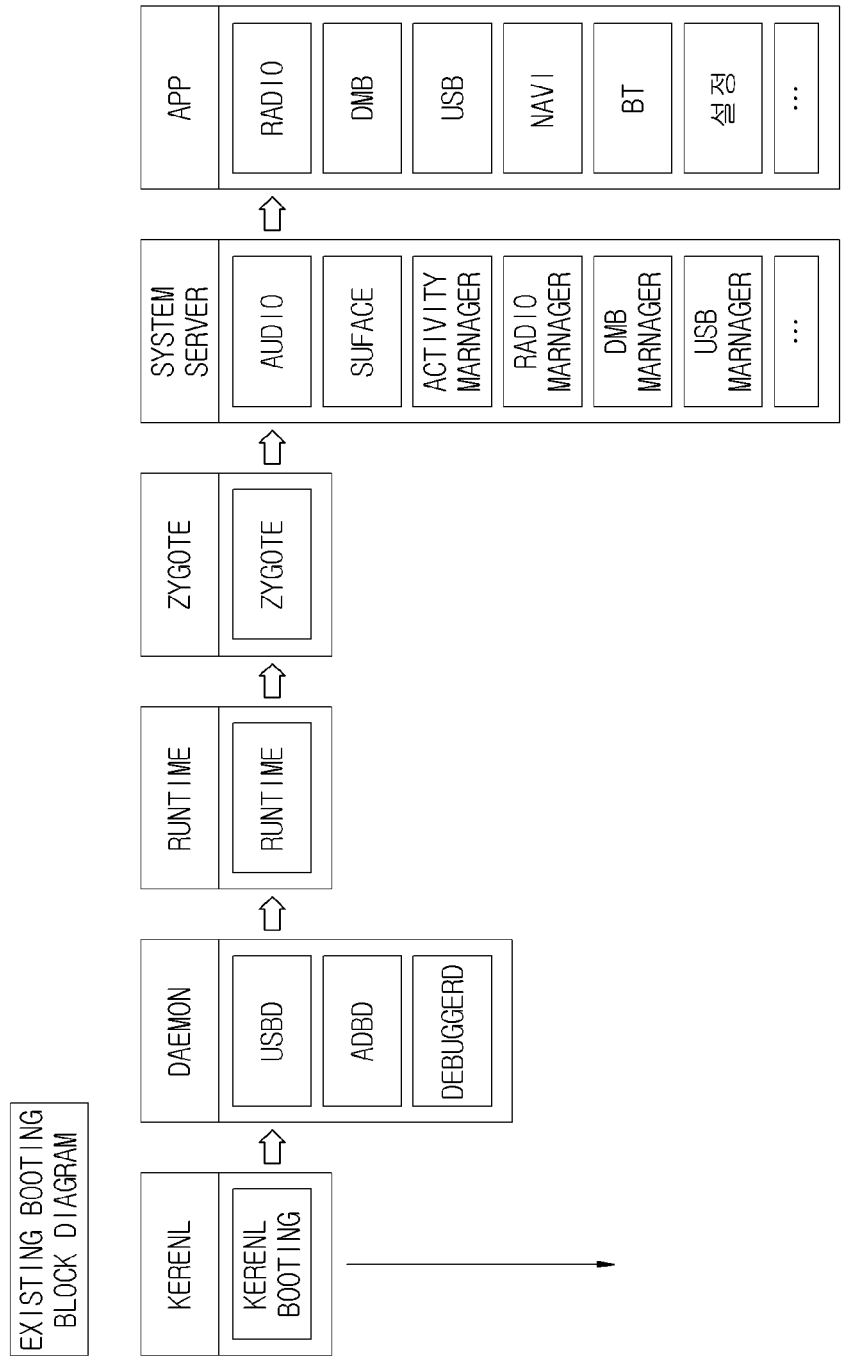
FIG. 3A and FIG. 3B are diagrams for describing differences between the application booting system according to an embodiment of the present invention and the related art.
Figure 3B:
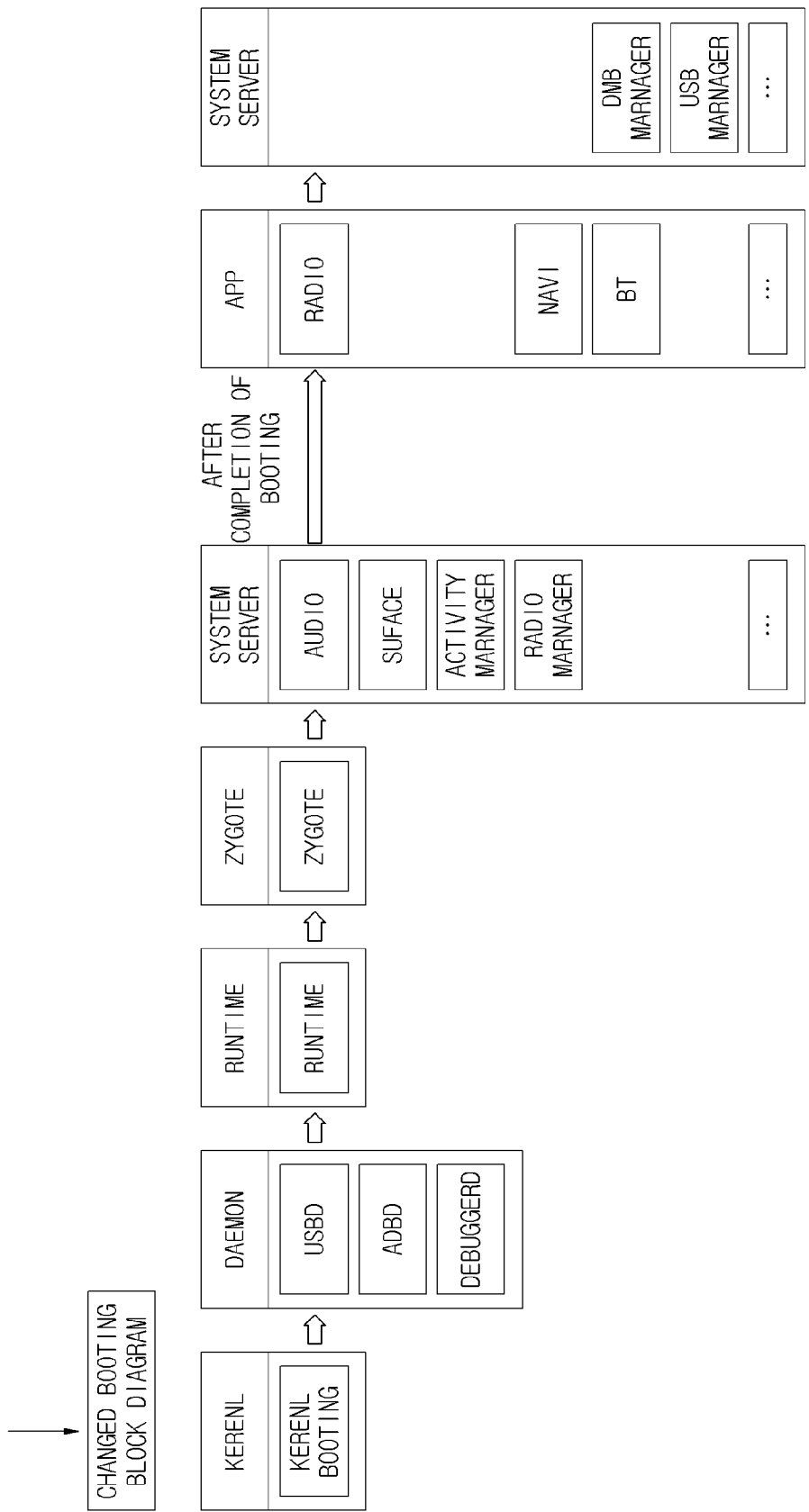

FIG. 3A and FIG. 3B are diagrams for describing differences between the application booting system according to an embodiment of the present invention and a related art AVN system.

As illustrated in FIG. 3A, when the related art AVN system is supplied with power, the related art AVN system ends a kernel initializing operation, and then calls an init process to execute Daemon, Runtime, and ZYGOTE. Also, functions necessary for a system server are executed, and all applications installed in the AVN system are booted.

On the other hand, the application booting system according to an embodiment of the present invention executes the functions necessary for the system server, and boots an application (for example, in FIG. 3B, Radio, NAVI, or BT) having a high possibility that is preferentially executed according to priority information. In addition, DMB and USB are booted after a system booting operation is completed, thereby enhancing the booting speed of the AVN system.

In this case, a system function (for example, in FIG. 3B, DMB Manager or USB Manager) of the AVN system for supporting an application (which is booted according to priority information after booting of the AVN system is completed) may be booted after another system function of the AVN system. That is, a system function booting order is changed according to a booted application, thereby more enhancing the booting speed of the AVN system.

Figure 4:
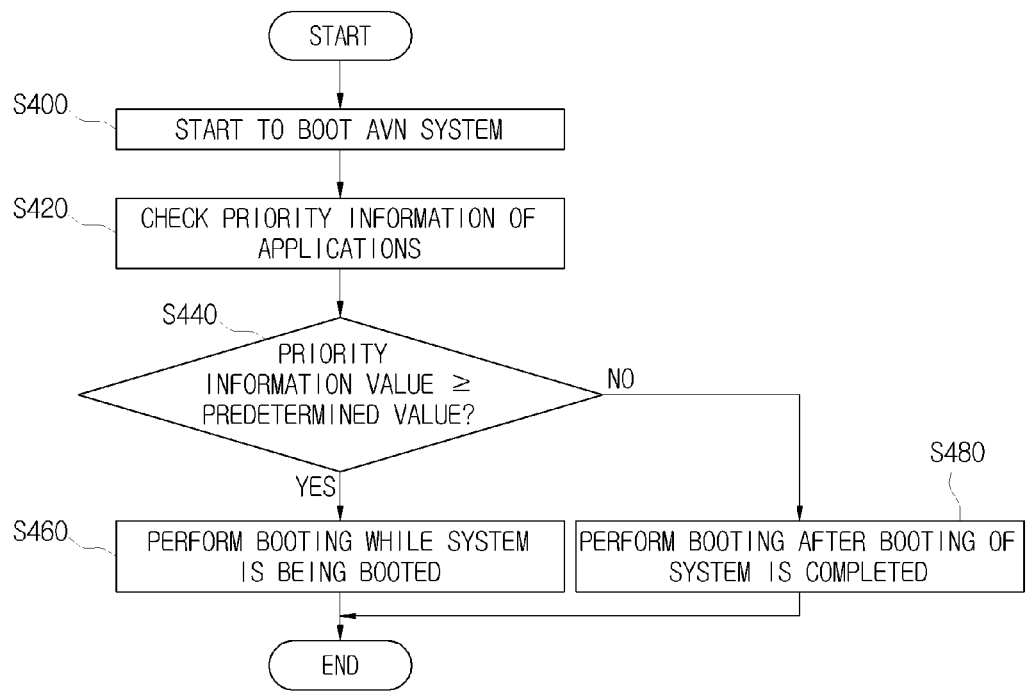
FIG. 4 is a flowchart illustrating an application booting method according to an embodiment of the present invention.

FIG. 4 is a flowchart illustrating an application booting method according to an embodiment of the present invention.

When the AVN system is supplied with power and starts to be booted in operation S400, the application booting system according to an embodiment of the present invention checks priority information of applications installed in the AVN system in operation S420.

The application booting system compares a predetermined value and a priority information value of each application installed in the AVN system in operation S440. When the priority information value is equal to or greater than the predetermined value, the application booting system boots a corresponding application simultaneously while the AVN system is being booted in operation S460. When the priority information value is less than the predetermined value, the application booting system boots a corresponding application while the booting of the AVN system is completed in operation S480.

Therefore, by differently controlling a booting time and booting order of each application installed in the AVN system according to a priority of each application, a whole booting speed of the AVN system is enhanced, thereby providing a user with an execution convenience of an application having a high importance.

As described above, the present invention provides the application booting system and method which differently control an application booting order according to an actual importance and the frequency number of use of each application installed in the AVN system, and thus shorten a time expended in booting the AVN system, thereby providing a user's convenience of application execution.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system for booting an application of a terminal, the system comprising:
 a priority setting unit configured to generate or update priority information of an application installed in a terminal, based on an execution time of the application, with respect to when a system of the terminal is booted, and an amount of executions of the application;
 a storage unit configured to store the priority information; and
 an application booting unit configured to boot, in response to power being supplied to the terminal, the application based on the priority information.

2. The system of claim 1, wherein:
 the priority setting unit is configured to generate the priority information based on the amount of executions of the application; and
 the amount of executions of the application represents executions of the application that have occurred within a predetermined time after system booting of the terminal is completed.

3. The system of claim 1, wherein:
 the priority setting unit is configured to generate the priority information, based on a multiplication of the amount of executions of the application and a weight based on the execution time of the application; and
 the amount of executions of the application is based on the execution time.

4. The system of claim 1, wherein:
 the priority setting unit is configured to generate the priority information, based on a summation of a first value and a second value;
 the first value is obtained by multiplying an amount of executions of the application in a first section and a first weight; and
 the second value is obtained by multiplying an amount of executions of the application in a second section and a second weight.

5. The system of claim 4, wherein:
 the first weight is a value for increasing the amount of executions in the first section; and
 the second weight is a value for decreasing the amount of executions in the second section.

6. The system of claim 1, wherein the application booting unit is configured to boot, in response to the power being supplied to the terminal, the application while the system of the terminal is being booted.

7. The system of claim 1, wherein the application booting unit is configured to boot, in response to the power being supplied to the terminal, an application having a value of the priority information that is equal to or greater than a predetermined value, while the system of the terminal is being booted.

8. The system of claim 1, wherein the application booting unit is configured to boot, in response to a system booting of the terminal being completed, an application having a value of the priority information that is less than a predetermined value.

9. The system of claim 1, wherein the application booting unit is configured to boot, in response to there being no priority information, all applications installed in the terminal while the system of the terminal is being booted.

10. A method of booting an application of a terminal, the method comprising:
   checking, in response to power being supplied to a terminal, priority information of an application installed in the terminal; and
   booting the application based on the priority information,
   wherein the priority information is generated or updated based on an execution time of the application, with respect to when a system of the terminal is booted, and an amount of executions of the application.

11. The method of claim 10, wherein:
   the priority information is generated by summating a first value and a second value;
   the first value is obtained by multiplying an amount of executions of the application in a first section and a first weight; and
   the second value is obtained by multiplying an amount of executions of the application in a second section and a second weight.

12. The method of claim 10, wherein the booting of the application comprises booting the application while the system of the terminal is being booted.

13. The method of claim 10, wherein the booting of the application comprises booting an application having a value of the priority information that is equal to or greater than a predetermined value, while the system of the terminal is being booted.

14. The method of claim 10, wherein the booting of the application comprises booting, in response to a system booting of the terminal being completed, an application having a value of the priority information that is less than a predetermined value.

15. The method of claim 10, further comprising:
   receiving information about a preference application from a user; and
   generating or updating the priority information based on the received information about the preference application.

* * * * *